Dec. 8, 1936. G. T. SOUTHGATE 2,063,467
WELDING AND CUTTING APPARATUS
Filed Dec. 23, 1931 2 Sheets-Sheet 2
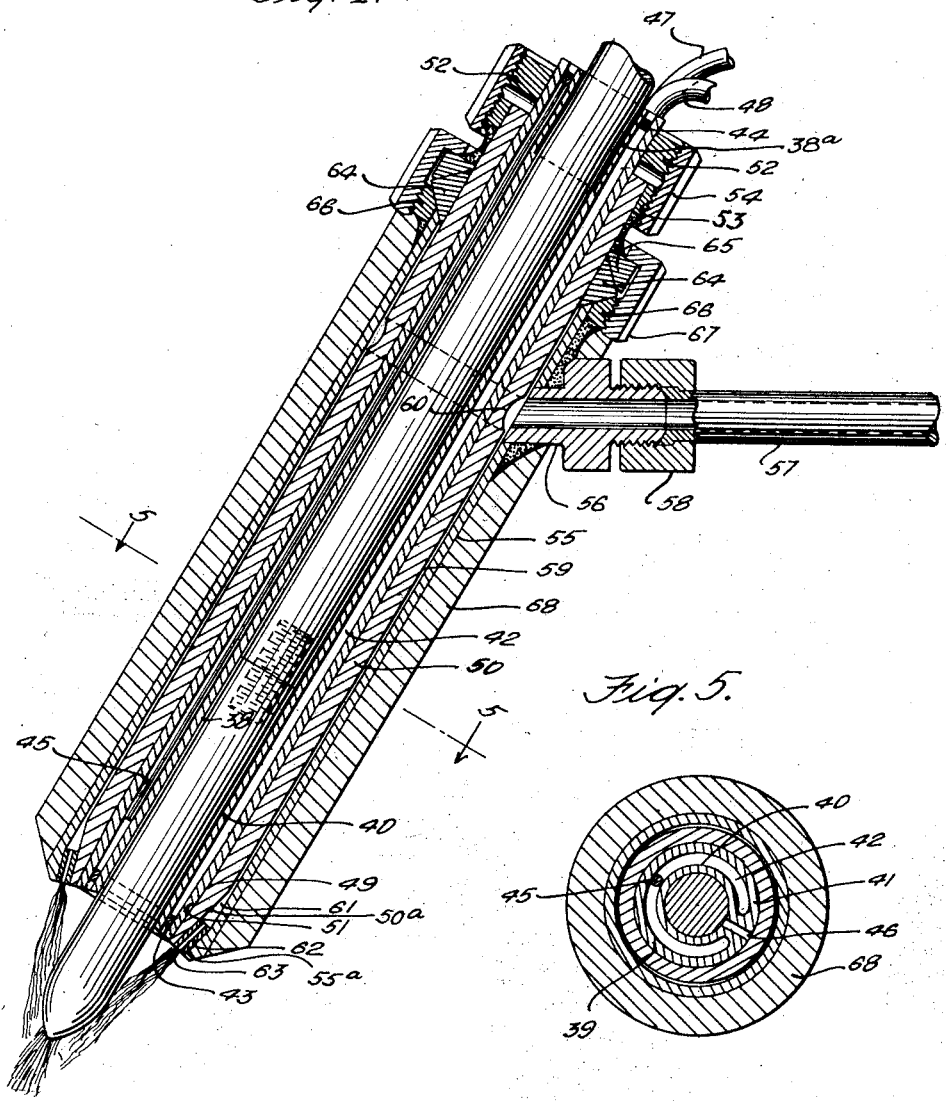
INVENTOR:
George T. Southgate,
BY ATTORNEYS Patented Dec. 8, 1936

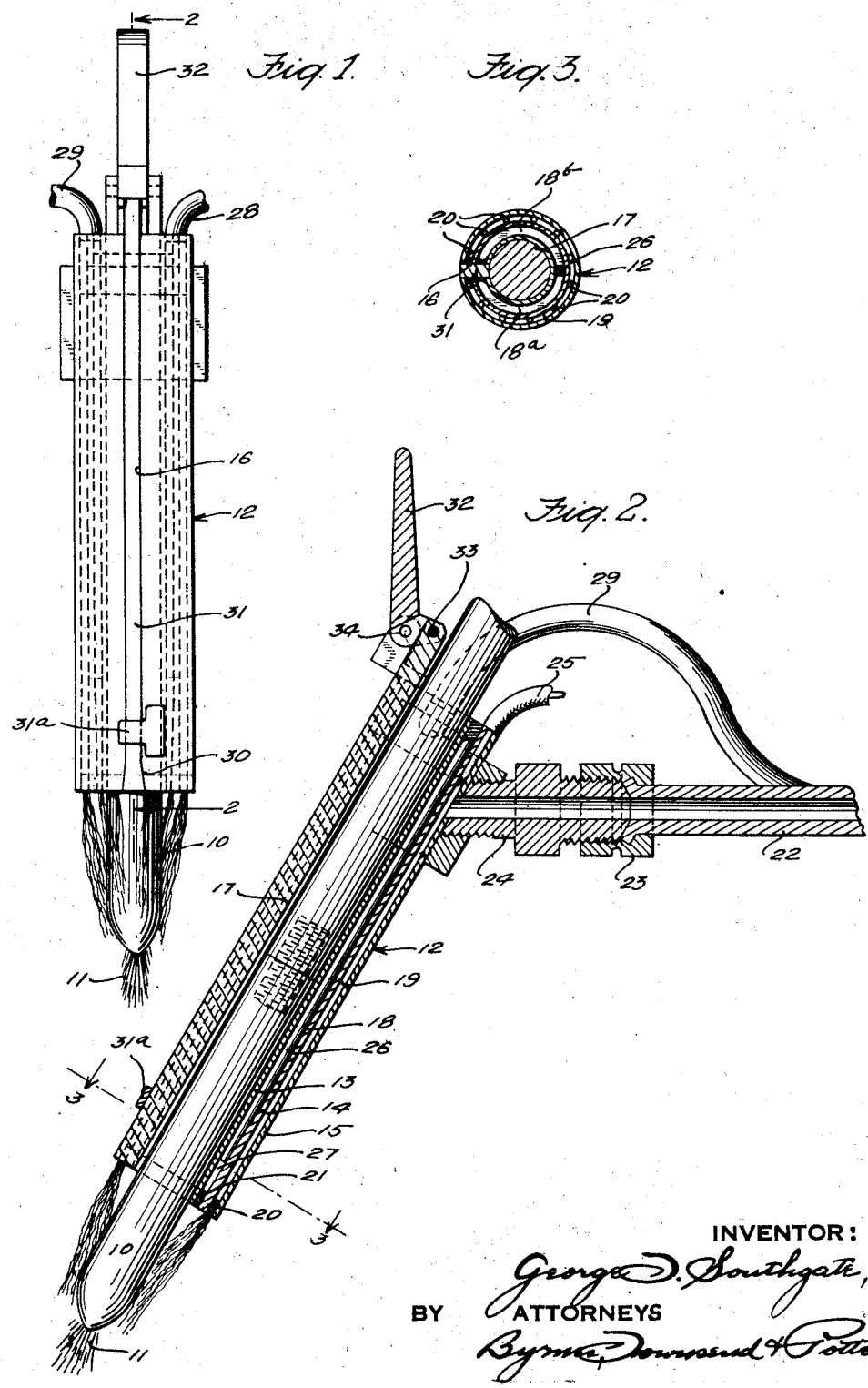

2,063,467

UNITED STATES PATENT OFFICE 2,063,467

WELDING AND CUTTING APPARATUS

George T. Southgate, Forest Hills, N. Y., assignor, by mesne assignments, to Union Carbide and Carbon Corporation, a corporation of New York Application December 23, 1931, Serial No. 582,850

24 Claims. (Cl. 219—8)

The present invention relates to apparatus for use in welding or cutting metal and particularly to such apparatus, in the use of which, the work in the welding region is heated partly or wholly by means of an electric arc. The invention has especial application to apparatus of this character for use in pyrelectric welding, wherein the heat of the electric arc is supplemented by a suitable flame, such as that supplied by the combustion of gases, and for use in cutting by means of an electric arc heating means in cooperation with an oxidizing jet. The term pyrelectric as herein used signifies broadly the use of a flame in conjunction with electricity for heating.

In apparatus of this character, it is desirable, for facility of manipulation, that a suitable support be provided for the electrode, in which the same may be readily adjusted by hand, and by which it will be frictionally held in any position of adjustment regardless of its cross section. In the employment of such apparatus, however, and particularly in welding, a very high temperature is developed in the welding region and adjacent thereto which seriously affects the positiveness with which the clamp grips the electrode owing to the expansion of the clamp and the deterioration of its resilience due to rise in temperature thereof.

In pyrelectric welding it is desirable, under certain circumstances, that the gases of combustion be fed around the electrode and, with this arrangement, there is danger that the gases, in being fed to the nozzle, will become pre-ignited by the heat conducted back by the electrode which is usually of high thermal conductivity and of the torch being damaged by such heat.

An important object of the present invention, is to provide, in welding or cutting apparatus employing an electrode for production of an electric arc, improved means for supporting such electrode and making a good electric contact therewith, in which the position of the electrode may be simply and easily adjusted and by which it may be frictionally and yieldably held in its various positions of adjustment, which will yieldably adapt itself to various diameters of electrodes, and in which, its gripping effectiveness will be uninfluenced by temperature changes in the vicinity thereof.

A further important object of the invention is to provide, in welding or cutting apparatus employing an electric arc in conjunction with a gas flame for heating the welding or cutting region, improved holding means for the electrode capable of resiliently gripping the same so as to make a good electric contact therewith and which at the same time will provide, in the electrode gripping region, a sufficient cooling influence to prevent the electrode from overheating the structure of the apparatus and from pre-igniting the gases being fed to the welding or cutting region.

According to the present invention, the welding apparatus may be provided with an electrode gripping support comprised of spaced coaxial tubular walls having a central bore and a gap extending the length thereof and communicating with the bore. These walls may be connected between their edges to provide a leak-proof chamber which may be divided into communicating compartments providing, with inlet and outlet passages, a conduit for the circulation of a cooling fluid therethrough. The support is preferably adapted to yieldingly grip an electrode for adjustment relative thereto and hold the same in various positions of adjustment and, to this end, the inner tube is constructed of resilient material and suitable means is provided coacting with the walls for controlling the expansion or contraction thereof in accommodating the bore to various diameters of electrodes. The apparatus may also be provided with suitable gas feeding means providing jets of combustible gas enveloping the electrode and welding region and serving to protect the welding region from the oxygen and nitrogen of the atmosphere as well as assisting the electrode in heating the work surface in welding or an oxidizing jet cooperating with the electrode in cutting, boring and the like. When such gas feeding means is employed, the chambers for the cooling fluid may be conveniently located between the same and the electrode so as to cool both the electrode and the gas being fed therearound, thereby preventing pre-ignition of the gas and damage to the torch structure.

The above and other objects and novel features of the invention will become apparent from the following specification taken with the accompanying drawings, in which:

Fig. 1 is a front elevation of the torch according to one embodiment of the invention, Fig. 2 is a longitudinal section therethrough on line 2—2 Fig. 1, Fig. 3 is a cross section on line 3—3 Fig. 2, looking in the direction of the arrows, Fig. 4 is a longitudinal section similar to that in Fig. 2 of a further embodiment of the invention, and Fig. 5 is a cross section on line 5—5 of Fig. 4.

In the form of the apparatus shown in Figs. 1 to 3 inclusive, an electrode 10, from which the arc represented at 11 is drawn, is shown as held in a support or holder 12: the support comprising an inner tube 13 of copper, bronze, or other electrically conductive material and tubes 14 and 15 secured thereto and coaxial therewith. The tubes 14 and 15 are of similar material to tube 13 and are welded, brazed or soldered together and to tube 13 in good electric contact so that the tubes may serve to conduct electric current to the electrode from a suitable source (not shown) connected thereto by a lead 25. The tubes are suitably constructed to yieldably grip an electrode and to accommodate themselves to various diameters thereof. In the form of apparatus illustrated, the resilient tubes are, to this end, split longitudinally thereof, the split extending their full length to provide a gap 16 which communicates with a central electrode-receiving bore 17.

The edges of the several tubes both at the ends and along the gap are connected together so as to provide leak-proof chambers 18 and 19 between them. Chamber 19 serves as a conduit to feed a gas, as oxygen for cutting, or a combustible gaseous mixture as oxygen and acetylene for welding, to the orifices 20 in the orifice ring 21 which is secured between the tubes 14 and 15 at the lower end of the torch. Chamber 18 serves to circulate a cooling fluid about the electrode and between the same and the chamber 19. The chamber 19 is preferably of very small cross section in order that the gas passing therethrough may be spread out in a thin layer whereby its cooling will be facilitated. The chamber 19 is supplied with gas from a suitable source or sources (not shown) through the tube 22 connected to the torch by a union 23 and a double threaded nipple 24.

The chamber 18 between walls 13 and 14 is preferably divided into two compartments 18a and 18b by a suitable partition 26 which may be in the nature of a wire soldered or otherwise secured to the adjacent tubes and extending almost the whole length of the chamber from the upper end to a point short of the lower end where a small gap, as at 27, is provided affording communication between the compartments 18a and 18b. The chamber 18 serves, as stated above, as a conduit for circulating suitable cooling fluid, as water, between the electrode and the gas conduit, the inlet being to compartment 18a through tube 28 and the outlet from compartment 18b through tube 29.

The region of greatest heat is, of course, at the lower end of the support or holder 12 and, in order that the greatest cooling effect may also be at this end, the chamber 18 is gradually narrowed toward its lower end by convergence of its walls. By this construction, the fluid is caused to move more rapidly in this region with a consequently greater cooling effect and this may be arranged so as to compensate to a great extent or wholly for the excessive heat in this region.

As stated above the tubes constituting the clamp are constructed of yielding material and they are preferably somewhat work-stiffened in order to impart thereto a moderate degree of resilient resistance to mechanical expansion whereby they are adapted to normally contract and provide gripping contact with an electrode within the bore 17 of the inner tube 13. The tubes may be expanded to release an electrode or to accommodate the central bore 17 to one of greater radial dimensions than that for which the bore is fashioned by means of the wedge-shaped end 30 of a rod 31 which is positioned in the gap 16. The rod is suitably held within the gap for movement longitudinally thereof as by a clip or finger 31a secured to the support 12 on one side of the gap 16 and extending so as to bridge the gap and overlap the support on the other side thereof. The rod is adapted to be actuated by suitable means, as a bell crank lever 32 having the end of one of its arms pivoted thereto as at 33, the lever being pivoted at the bend therein to the supporting member 12 as at 34.

In operation, the electric arc is established in the usual manner and either a combustible mixture of gas or an oxidizing stream is fed through the orifices 20 to the region about the electrode according as the apparatus is to be used for welding or cutting. The gaseous mixture serves in case of welding to assist the electric arc in heating the work and to provide a protective envelope about the welding region, preventing the puddle from being injuriously influenced by the oxygen or nitrogen of the atmosphere. This arrangement in the apparatus is particularly advantageous in work upon heavy bodies such as high pressure vessels where great heat penetration is required. It also increases the speed of welding, reduces the concentrated heating stresses and imparts to electro-welding the chemical and metallurgical behavior in which arc welding is lacking and which comprises one of the excellencies of oxy-acetylene welding. The preferred gases used with the apparatus are oxygen and acetylene so proportioned as to give neutral combustion, although other combustibles burning with a high temperature may be employed.

During the operation of the torch the cooling fluid is caused to circulate continuously through the chamber 18; the fluid flow increasing in speed in approaching the lower end of the chamber 18 owing to its constricted cross section in this region. By this arrangement the greatest cooling effect will be in the region of greatest heat and in which the thermal conductance of the electrode tends most to the overheating of the torch structure. The tube 13 is in contact with the electrode substantially throughout its length and, where jointed electrodes are employed, the current will be led into the same below the joint at all times except when the joint is about to emerge from the tube, thus avoiding a rise of temperature on account of the resistance at the joint until substantially the end of travel of the joint within the tube is reached. By reason of this large area of contact between the electrode holding and cooling device, it is possible to use a considerably higher current density with generated voltages up to 90 volts and arc voltages up to 50 volts resulting in greater stability of the arc.

Where a metallic electrode is employed special feeding mechanism is necessary for its advancement since it melts away quite rapidly. On the other hand, with the employment of carbon or graphite electrodes, the consumption thereof is so slow as to render feeding by hand quite feasible and, with the present construction, this latter variety of electrode will be most generally used.

The gas conduit of chamber 19, is preferably quite constricted in cross section and in consequence the velocity of the gas passing therethrough will be quite great for any given pressure. This high velocity will tend to prevent back fire in case of an explosive mixture, and its spread in a thin film within the chamber 19 will hasten heat transfer between the same and the cooling medium in chamber 18.

The construction, as above described, is quite simple, comprising a comparatively small number of parts, and is quite substantial and rugged which are qualities highly desirable in apparatus of this character.

The alternative form of apparatus shown in Figs. 4 and 5 varies from the above construction mainly in the means provided for varying the electrode receiving bore and in the specific construction of the chambers serving as conduits for the cooling fluid and oxidizing or combustible gas.

The construction of this form of apparatus is as follows. The electrode gripping member is formed by flattening a metallic tube 39 and turning the edges so formed toward each other so as to provide a re-entrant tubular portion 40 serving to hold the electrode and a tubular portion 41 surrounding the same, connected thereto, and spaced therefrom to provide a chamber or conduit 42 corresponding to chamber 18 in Figs. 1, 2 and 3 for the cooling fluid. The lower and upper ends of this chamber are closed as by solder rings 43 and 44 and the chamber is divided by a longitudinally extending wire 45 as in the first described form. A gap 46 formed by the turning of the metal upon itself corresponds to the gap 16 and, in like manner, communicates with a central electrode receiving bore 38. Likewise conduits 47 and 48 leading to and from chamber 42 correspond to conduits 28 and 29.

The outer wall of this chamber 42 is slightly tapered at its lower end as shown at 49 and a tubular member 50, serving as a housing for member 39, is provided with a cylindrical bore except at its lower end where it is tapered as shown at 51 to correspond with the taper 49. The member 39 is provided at its upper end with a radial flange 52 and the tubular member 50 with a similar flange 53 both of which flanges are in threaded engagement respectively with right and left hand threads on a nut 54 whereby, by turning of the nut in one or the other direction, the bore of member 39 may be contracted or permitted to expand by movement of the member 50 axially relative thereto under control of the nut.

Contraction and expansion of the member 39 is largely prevented by flange 52 in the region adjacent thereto and, in consequence, the bore 38 is somewhat enlarged in this region as indicated at 38a so as to be at all times out of contact with an electrode placed in the bore.

The tubular member 50 may serve also as one wall of a passage or gas conduit 59 which surrounds and is coaxial with the electrode gripping member 39, the other wall being supplied by the tubular member 55 surrounding and coaxial with member 50. The bore of member 55 is preferably of but slightly greater diameter than the outer diameter of member 50 so as to provide a passage of very small cross sectional area for the gas, whereby the same will be spread out in a thin film facilitating heat transfer between the gas and cooling fluid in chamber 42 and increasing the velocity of the gas so as to prevent back fire. The passage is supplied with gas through the bore of the tubular stem 56 and tube 57 connected thereto by union 58. Opposite this bore. the passage 59 is enlarged to provide an annular equalizing groove or channel 60, a second equalizing groove or channel being provided at the lower end of the passage at 61.

In this latter channel is set an orificed ring 62 having a plurality of orifices 63 annularly arranged about the electrode and preferably directed at an angle toward the lower end of the same. This ring 62, preferably of some soft metal, as copper, is accurately fitted to a taper 50a on the lower outside of tube 50 and is pressed into position against the taper 50a by a similar taper 55a within the end of tube 55. Thus, the ring 62 is tightly clamped between the two tubes and serves both as an orifice member and as a key member between the two tubes. The orifices therein direct the gas so as to form an envelope about the electrode and, when a combustible mixture is being used, so as to protect the puddle in the manner stated above and preheat the metal in the region of the arc. The upper end of the passage is closed by a soft rubber packing ring 64 held in place between a radial flange 65 on member 50 and a radial flange 66 on the upper end of member 55. The flange 66 is in threaded engagement with a union nut 67 which has a flange bearing on the flange 65 whereby the grip on the orifice ring may be tightened or loosened by rotation of the union nut.

A covering 68 of asbestos or the like, is provided for the torch which serves the double purpose of electrically insulating the gas tube against accidental contact with the work body and against being burned or pitted thereby, and thermally protecting this tube from arc radiation and flame sweepage.

In this apparatus, the electrode is gripped by the member 39 substantially throughout its length, with some degree of yielding contact except for the recessed portion at 38a, but an accentuated grip at the lower end is effected by the coacting tapers at 49 and 51, by which a good contact with undersized electrodes along at least a portion thereof is assured. Such a grip by the lower end of the tube enhances the cooling effect of the cooling fluid in chamber 42 in the region where high temperatures aided by the high thermal conductivity of the electrode tends most to overheat the structure since the firm grip facilitates heat transfer. This arrangement also insures the passage of electric current from the walls of the tube to the electrode below any joint that may be present in the electrode, thus postponing the rise in temperature caused by the increase of resistance due to the presence of such joint until the joint has reached the extreme lower end of the tube and is about to emerge therefrom.

The inter-relation of parts herein described in connection with Figs. 4 and 5 gives not only the required functional performance, but also provides an economical organization for fabrication, and for ease in assembly, dismantling, and alteration of construction. For example, orifice r'ng 62 may be readily replaced by removing tube 50, dropping out the old ring by inverting the torch, dropping in the new ring and reinserting tube 50. Similarly the electrode tube 39 is easily removed for inspection, replacement or repair, and may be readily replaced by another fitting an electrode of different diameter. In operation, this second embodiment of the invention is in all essentials the same as the first herein described.

I claim:

1. In welding apparatus, the combination of means for yieldably gripping an electrode; and means for passing fluid through the yieldable gripping means.

2. In welding apparatus, the combination of means for yieldably gripping an electrode; and means within the yieldable gripping means for cooling said yieldable gripping means.

3. In welding apparatus, means for supporting an electrode comprising a member provided with a bore having a yielding wall for gripping the electrode and a wall coaxial with and spaced from the electrode gripping wall; said last named wall being integrally connected with the first named wall throughout its length.

4. In welding apparatus, the combination of an electrode; means for yieldably gripping and supporting the electrode; and a conduit within the gripping means for accommodation of cooling means.

5. In welding apparatus, the combination of a support for an electrode comprising a tubular body having a radially variable bore for reception of the electrode; and means for effecting the variation of said bore.

6. In welding apparatus, the combination of an electrode; means for supporting the electrode comprising a tubular body of yielding material having a bore for reception of the electrode and a gap extending longitudinally of the tubular body in communication with the bore; and means for expanding the bore of said supporting means.

7. In welding apparatus, the combination of an electrode; means for supporting the electrode comprising a tubular body having a variable bore for reception of the electrode and a gap extending longitudinally of the tubular body in communication with the bore; and means operable in the gap for effecting the expansion and contraction of the bore.

8. In welding apparatus, means for supporting an electrode including spaced coaxial tubular walls; the inner wall being adapted to yieldably grip an electrode; and means for passing fluid between said walls.

9. In welding apparatus, the combination of a support for an electrode comprising spaced coaxial, yielding tubular walls connected at their edges; said support having a gap extending the length thereof and communicating with the bore of the support; a member extending lengthwise of the support for dividing the space between the walls; said support having a passage around said member at the lower end thereof; and means for passing fluid into said space on one side of the member and out of the space on the other side.

10. In welding apparatus, the combination of a support for an electrode comprising spaced, coaxial, tubular walls connected at their edges to form a fluid tight chamber therebetween; said space being divided into an inlet and outlet chamber having a communicating passage at the lower end; the tubular walls converging at the lower end of the support to provide a constriction in the chamber; and means for passing fluid into the inlet chamber and out from the outlet chamber.

11. In welding apparatus, the combination of a holder for an electrode and means providing a fluid passage surrounding the holder and having apertures for feeding fluid around the electrode; said holder having cooling means between the electrode and fluid passage.

12. In welding apparatus, the combination of an expansible and contractible holder for an electrode and means providing a fluid passage surrounding the holder and having apertures for feeding combustible fluid around the electrode; said holder having a conduit for cooling fluid between the electrode and fluid passage; and means for effecting expansion and contraction of the holder about an electrode.

13. In welding apparatus, the combination of an electrode; a tubular member of resiliently yielding material for supporting the electrode; a tubular member surrounding the first named member having a tapered bore and movable axially of the first named member for causing contraction thereof; and means co-operating between the members for causing such axial movement.

14. In welding apparatus, the combination of an electrode; a tubular member adapted for yieldably supporting the electrode; a gas feeding conduit surrounding the member; said conduit having a thin tubular passage and orifices leading from the passage and surrounding the electrode for directing a tubular envelope of gas therearound.

15. In welding apparatus, the combination of an electrode support; tubular members surrounding the support and having a thin tubular passage therebetween; said members having at their lower ends correspondingly tapered walls in opposition to each other; an orifice ring removably gripped between said tapered walls; and means for causing relative axial movement between the walls.

16. In welding apparatus, the combination of an electrode support comprising spaced tubular walls connected around their edges; means for circulating cooling fluid through the space between the walls; said walls having a longitudinally extending gap and a wedge member movable longitudinally in said gap and having edges contacting with those of the gap.

17. In a cutting or welding torch, the combination of an electrode; a holder therefor; means in the holder for feeding an envelope of gas around the electrode; and means for circulating a cooling medium between the electrode and gas.

18. In welding apparatus, the combination of an electrode; a tubular member for yieldingly supporting the electrode; means for feeding an envelope of gas around the electrode; and means between the electrode and gas feeding means whereby heat transfer between the electrode and gas feeding means is substantially prevented.

19. In welding apparatus, the combination of an electrode; a holder of yieldable material therefor; said holder comprising a tubular member formed with spaced, integrally formed, coaxial walls; the connection between the walls extending lengthwise thereof.

20. In welding apparatus, the combination of an electrode; a holder of yieldable material therefor; said holder comprising a tubular outer wall reentrant longitudinally thereof to form an inner wall spaced from the outer wall and to provide a gap extending longitudinally of the holder.

21. In welding apparatus, the combination of an electrode; a member adapted to yieldably grip and support the electrode; said member comprising spaced coaxial integrally connected walls constructed and arranged to provide a space for accommodation of heat dissipating means.

22. In a welding operation which comprises striking an arc between a current-carrying electrode and a work piece, supplying to the said arc a combustible mixture of gases, and feeding the said mixture along and in relatively close juxtaposition to a substantial portion of the said electrode; the method of inhibiting a premeature ignition of the said mixture which includes extracting heat from the space between the said mixture and the said electrode.

23. In a welding operation which comprises striking an arc between a current-carrying electrode and a work piece and supplying to the said arc a combustible mixture of gases; the method of feeding the combustible mixture which includes passing the mixture along and in relatively close juxtaposition to a substantial portion of the electrode, and interposing a cooling fluid in heat-exchange relationship with both the mixture and the electrode.

24. In a welding operation which comprises striking an arc between a current-carrying electrode and a work piece, and surrounding the said arc with a curtain of a combustible mixture of gases; the method of feeding the gases to the combustion area which includes passing the mixture in closely spaced relation to a portion of the current-carrying electrode, circulating a cooling fluid in the space between the mixture and the said electrode, and adjusting the circulation of such fluid so as to maintain the gases below a combustion temperature during passage to the combustion area.

GEORGE T. SOUTHGATE.